Figure 16:
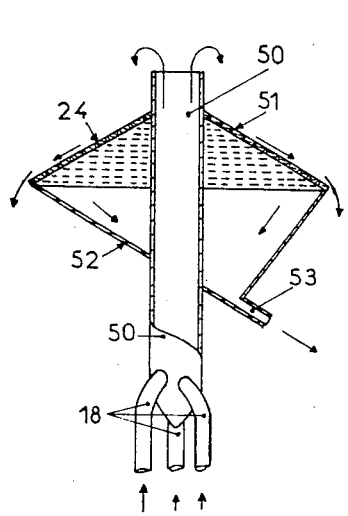

United States Patent

Lagoutte

[15] 3,667,604
[45] June 6, 1972

[54] MOVING BED APPARATUS FOR THE TREATMENT OF FLUID

[72] Inventor: Pierre Lagoutte, Charly, France

[73] Assignee: Filtres Vernay, Villeurbanne (Rhone), France

[22] Filed: June 4, 1970

[21] Appl. No.: 43,467

[30] Foreign Application Priority Data

Sept. 9, 1969 France....................................6931267

[52] U.S. Cl...............................210/136, 210/189, 210/268
[51] Int. Cl.........................................................B01d 33/16
[58] Field of Search ...........................210/33, 136, 189, 268

[56] References Cited

UNITED STATES PATENTS

| | | | |
|---|---|---|---|
| 3,563,385 | 2/1971 | Bykov | 210/268 |
| 3,537,582 | 11/1970 | Demeter | 210/268 X |
| 3,556,299 | 1/1971 | Zievers | 210/136 |
| 3,415,382 | 12/1968 | Martin | 210/489 X |
| 3,150,063 | 9/1964 | Comte | 210/189 X |
| 1,903,612 | 4/1933 | Dotterweich | 210/189 |

Primary Examiner—Samih N. Zaharna
Attorney—Sughrue, Rothwell, Mion, Zinn & Macpeak

[57] ABSTRACT

A fluid is filtered by passing a stream of fluid through a porous wall of an inlet chamber through a treatment zone filled with treatment material and then through another porous wall into a collecting chamber. The flow from the inlet chamber to the collecting chamber is substantially horizontal and a vertically upwardly directed liquid stream passes through the treatment material at the bottom of the container to entrain particles of the treatment material and lift them to the top of the container to provide for recirculation of the treatment material. The treatment material is regenerated during the circulation with the impurities being removed from the container near the top portion thereof above the treatment material.

2 Claims, 20 Drawing Figures

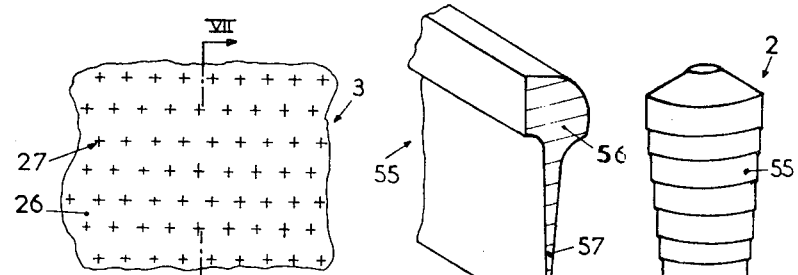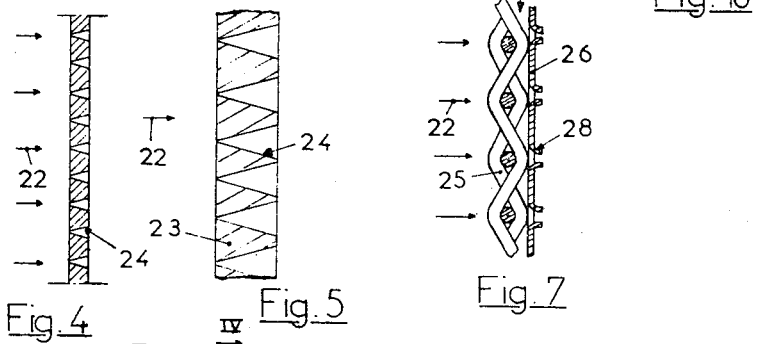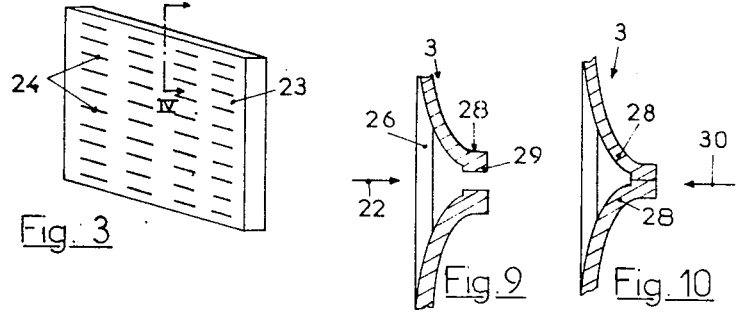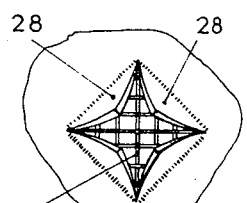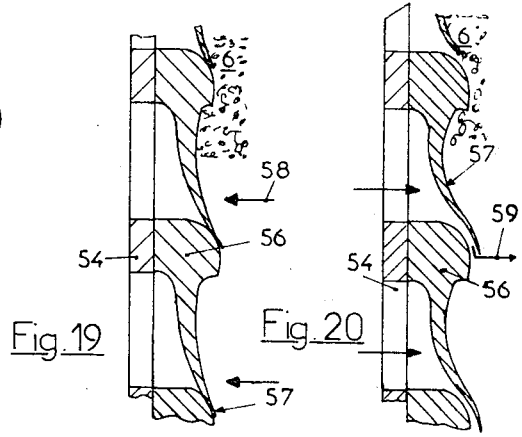

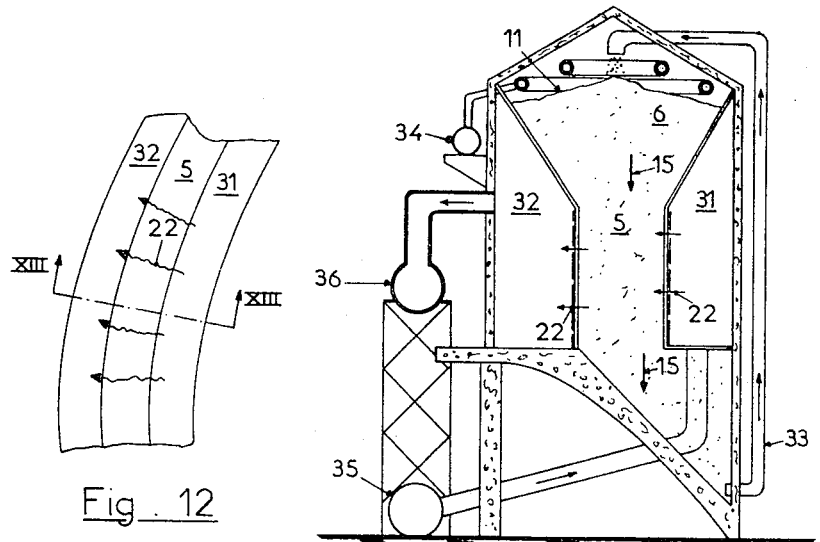
Fig. 12
Fig. 13
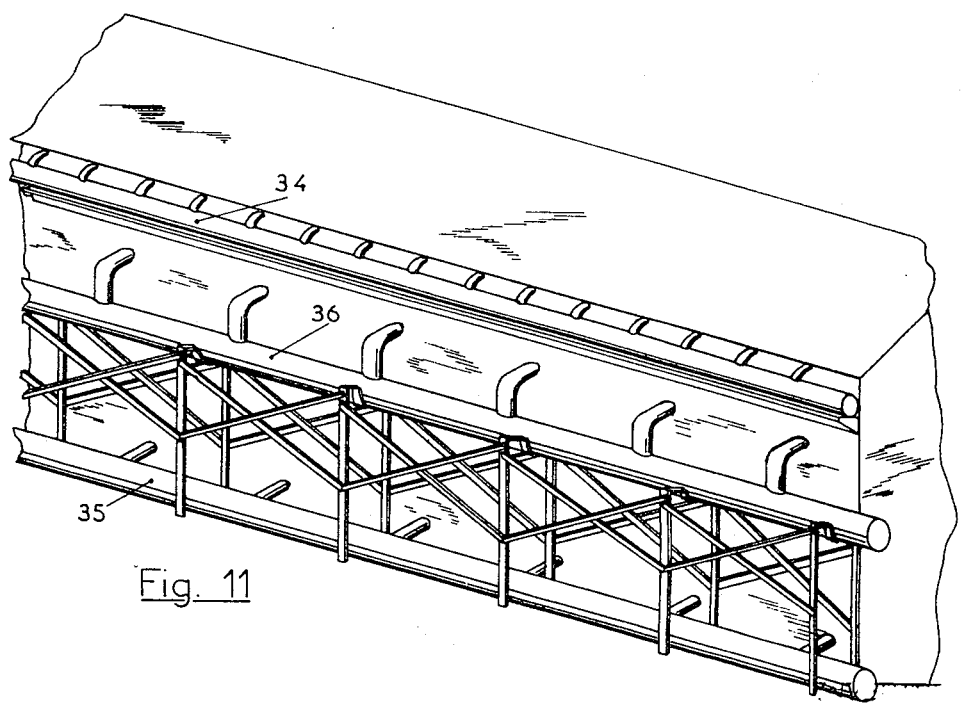
Fig. 11

3,667,604

MOVING BED APPARATUS FOR THE TREATMENT OF FLUID

The present invention relates to a method and apparatus for the treatment of fluid and more particularly to a continuous treatment of fluid by passing it through a bed of treating material.

The fluid may be liquid or gaseous, and it can take the form of a liquid, a suspension, a solution, or used water which it is proposed to subject to some kind of treatment. In particular, the invention is useful for the filtration or purification of water.

The treating material, which forms the bed may be constituted by solid particles of which the shape, dimensions and nature are adapted to the particular treatment problem. For example, if it is proposed to filter impure water, the treatment material may be constituted by fine particles of siliceous sand, or of treated anthracite. If on the other hand it is proposed soften hard water, the treatment material would be an ion exchanging material, formed of small pellets of cationic resins in sodium cycle.

The invention also includes the regeneration of the treatment material, and in its preferred form, provides means whereby the regeneration can be carried out continuously.

Generally speaking, fluid treatment apparatus which is known at present, cannot be operated continuously. In the case of filtration for example, the filter must be periodically taken out of use, to allow it to be subjected to a cleansing or regeneration treatment. The same applies in the case of water softening, in which the regeneration of the exchanging resins necessitates stopping the softener.

In some other known installations, a mobile bed of treatment material is continuously regenerated, but this is only achieved by such complication that the installation becomes costly and difficult to maintain.

The present invention has the aim of avoiding these disadvantages, by providing apparatus of small overall dimensions and relatively low cost price which is capable of carrying out fluid treatment with continuous operation.

An object of the invention is to provide apparatus for the treatment of fluid comprising an inlet chamber having a first foraminous wall; a collecting chamber having a second foraminous wall; said first and second foraminous walls being spaced from each other to provide a treatment zone between them; means for passing fluid to be treated from said inlet chamber to said collecting chamber through said first foraminous wall, across said treatment zone through said second foraminous wall; and means to pass treatment material through said treatment zone in a path traversing the path of said fluid.

According to a first embodiment, the device is made in a cylindrical shape. In this case, the fluid arrives in a central chamber surrounded by a first porous wall around which descends the annular flow of the treatment medium, the second porous wall surrounding in its turn the active zone of the mobile bed to form a peripheral annular chamber in which the fluid is collected after treatment. The whole is contained inside a cylindrical reservoir. The circulation of the bed is caused by a syphon effect, owing to injectors situated at the base of the reservoir which send out upwardly directed jets inducing the rise of the medium of the bed through tubular conduits from which it falls back above the active zone to form a bank above which are draining pipes which carry away the overflow charged with the solid substances to be eliminated.

According to another embodiment, the device takes a linear form (rectilinear or curvilinear) having throughout its length a central zone formed by the falling bed and lying between a distribution chamber for the crude fluid and a collecting chamber for this same fluid when treated, ramps and channels being provided along the device to distribute the bed circulation injectors, as well as the drains and various connections.

Figure 1:
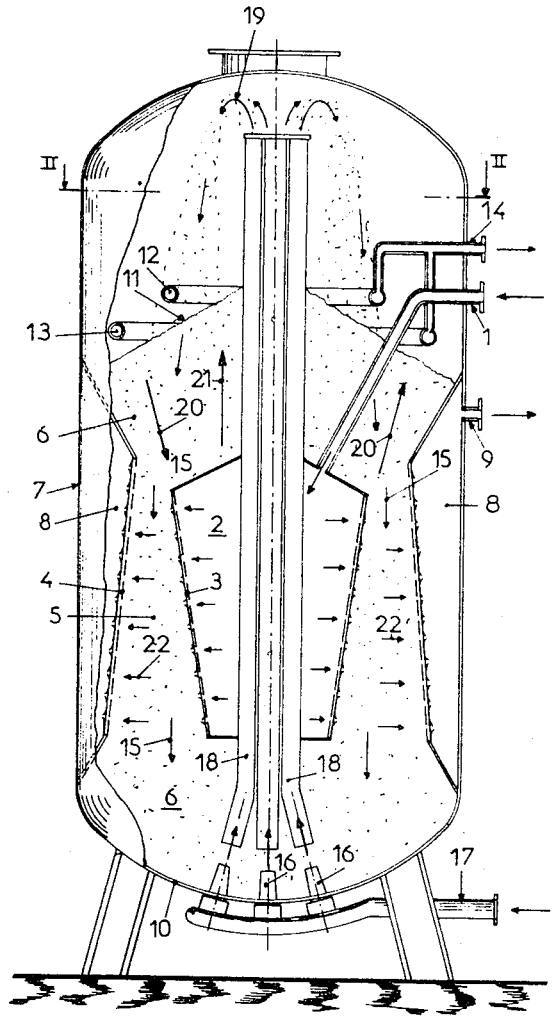
Figure 2:
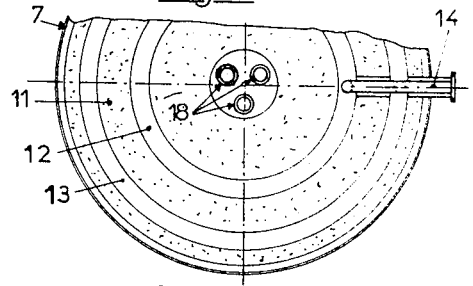
Figure 14:
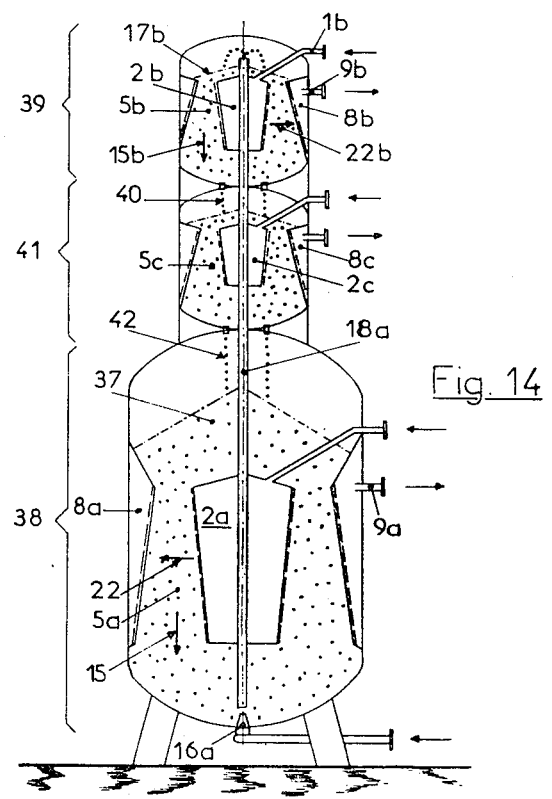
Figure 15:
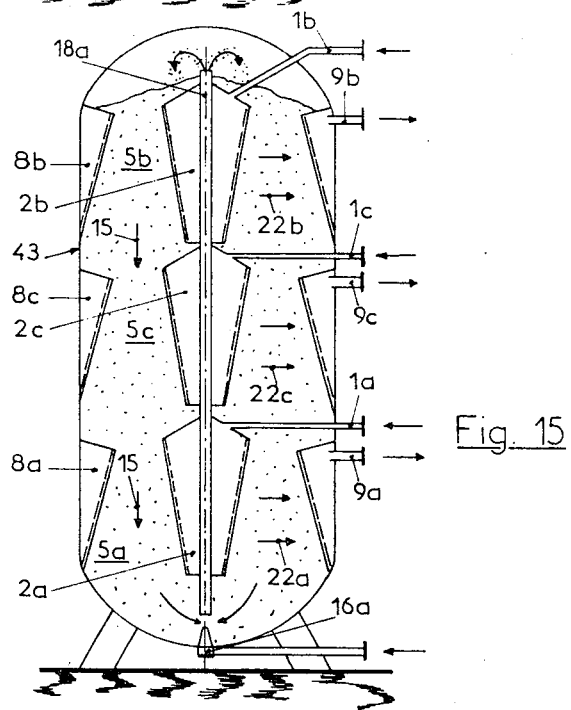

Further objects and preferred features of the invention will appear from the following description of certain practical embodiments, which are given by way of examples only, with reference to the accompanying drawings in which:

FIG. 1 is a part sectional view through a continuous filter apparatus in accordance with the invention, FIG. 2 is a part section along the line 22 in FIG. 1, FIG. 3 is a perspective view of a panel intended to form part of a porous wall, FIG. 4 is a section along the line IV—IV in FIG. 3, FIG. 5 is an enlarged view showing a part of the section shown in FIG. 4, FIG. 6 is a front view of an alternative form of porous wall, FIG. 7 is a section along the line VII—VII in FIG. 6, FIG. 8 shows to a larger scale a detail of the wall shown in FIG. 6, FIG. 9 is a cross-section through part of a foraminous wall, in the open condition, FIG. 10 is a view similar to FIG. 9, but showing the wall in the closed condition, FIG. 11 is an external perspective view of an alternative arrangement of filtration device according to the invention, FIG. 12 is a diagrammatic cross section through another form of the filtration apparatus, FIG. 13 is a vertical section taken on the line XIII—XIII in FIG. 12, FIG. 14 is a vertical section through another form of apparatus for continuously softening water and regenerating the bed of ion exchanging resins, FIG. 15 is a view similar to FIG. 14, but showing an alternative arrangement, FIG. 16 is a detail view partly in section of a recovery head which can be used in the apparatus shown in FIG. 1, FIG. 17 is a part sectioned view through a flexible band for forming a foraminous wall, FIG. 18 illustrates the band shown in FIG. 17 in the coiled condition, FIG. 19 is a cross section to an enlarged scale through part of the wall shown in FIG. 18, in the closed condition, and FIG. 20 is a view similar to FIG. 19, but showing the open condition.

The apparatus illustrated in FIGS. 1 and 2 is for the filtration of impure water, and it will be observed, that in general it takes the form of a cylindrical reservoir 7, supported on legs. An inlet pipe 1 is provided to lead the water into a central inlet chamber 2, and the peripheral wall 3 of the chamber 2 is porous. The construction of the porous wall 3, will be hereinafter described.

Another porous wall 4, surrounds the porous wall 3, but is spaced therefrom, and it will also be observed that this porous wall 4 is spaced inwardly from the outer wall of the reservoir 7. Thus, between the two porous walls 3 and 4, there is formed an active treatment zone 5, which in use is occupied by a filtration bed 6, which may be constituted by grains of sand or of treated anthracite. Equally, the bed 6 may be formed from calibrated balls of glass or ceramics, or of any other appropriate substance, but in any event, it is preferred that the bed shall be constituted by discrete particles of material.

Between the porous wall 4 and the solid wall 7 of the reservoir, there is formed a collecting chamber 8, which receives the filtered water. This cleared water, can be evacuated through a pipe 9.

The filtering medium 6 (for example sand or anthracite) fills the interior of the reservoir formed by the wall 7 and its lower end 10. Above the chambers 2 and 8, this medium forms a bank 11, above which are provided annular suction manifolds 12 and 13 connected to a drain or purge pipe 14.

The opposing walls 3 and 4 of the chambers 2 and 8, are divergent in the downward direction, as shown in FIG. 1, to facilitate the descent of the bed of material 6 into the active zone 5 (see arrows 15). A series of injectors 16 which are adapted to be supplied with impure water under pressure through a pipe 17 by means not shown, project through the lower end 10 of the reservoir, and are upwardly directed. A corresponding series of vertical conduit pipes 18 pass upwardly through the inlet chamber 2, then through the banked material 11 above the chambers 2 and 8, to a position near to the upper end of the reservoir 7. Both ends of the pipes 18 are open, and it will be observed that each of these pipes has its lower end facing one of the injectors 16, but that there is a short gap between each injector 16 and its corresponding pipe 18. In use, these injectors 16 emit rising jets of water which draw particles of the sand 6 by syphon effect, into the vertical pipes 18. The sand thus mixed with the impure water rises in the pipes 18, where its dirty particles are cleaned by friction. Then it is poured out at the top of the pipes 18 (see arrows 19) to fall back on to the bank 11 of treatment material. Because of their particular speeds of sedimentation, the particles of sand fall directly on to the bank 11. The particles of impurities are separated from them by various processes.

In a first process, use is made of the fact that the dirty particles float on the surface, which allows them to be drawn up by the purging manifolds 12 and 13. This action is facilitated by a slight lateral leak (see arrow 20) of the water, which, coming from the chamber 2 rises across the bed of treatment sand 6 instead of flowing horizontally towards the permeable wall 4 of the collecting chamber 8.

In a second process, the pipes 18 are topped by means of a head shown in FIG. 16. The three pipes 18, join into a single tube 50, from which the charged liquid falls back on to the permeable wall 51 of a collector 52. This wall 51 is in the shape of an inverted funnel and is made from rubber or plastics material. Moreover, the wall 51 is formed with a plurality of fine slits or perforations 24 which may be of the kind hereinafter described with reference to FIG. 5. The liquid ejected from the upper end of the tube 50 streams over the wall 51, so that the dirt particles which are finer than the particles forming the treatment bed 6, but having a similar sedimentation speed because of their greater relative density, are captured in the collector 52. The effluents are drained from the collector 52 by a pipe 53.

The cycle of operation of the apparatus shown in FIGS. 1 and 2 is as follows:

The active treatment zone 5 of the filter is defined between the divergent porous walls 3 and 4. This arrangement removes any restriction from the filtering bed, which would tend to become less mobile and less fluid because of its increasing charge of captured dirt particles. The vertical speed of descent of the bed (see arrow 15) is adjustable to the flow and concentration of suspended matter in the impure water flowing out from the inlet chamber 2. The active zone 5 is situated within the reservoir, at a level such that the regenerated filtering bed (bank 11) forms above the active zone 5 a layer of sufficient height 21 for the establishment of good horizontal filtration circuits (arrows 22).

The filtering bed 6, contaminated by the captured dirt particles during passage through the active zone 5, descends (arrows 15) and flows towards the injectors 16, which send it back to the top of the apparatus (arrows 19) via the pipes 18.

It will be seen therefore that the filtration in the active zone 5 is carried out by the crossing of two currents, namely the vertical descending current of the treatment bed (arrows 15) and the radial horizontal current of the water (arrows 22). Whilst in this particular apparatus, the flow of the fluid to be treated (i.e. the dirty water) is in a horizontal direction, and the flow of the treatment material is in a vertical direction, it should be understood, that any arrangement in which the two flows cross each other, is within the scope of the invention.

The driving water may be set in motion by a pump (not shown) with a variable speed, which feeds the pipe 17. Also partial re-cycling of the flushing water (through the pipes 14) may be provided.

The walls 3 and 4 may be made by the juxaposition of panels 23 of the kind illustrated in FIGS. 3 to 5. Each of these panels is pierced by a series of slits 24, which form unidirectional nozzles. Reference to FIG. 4, and more especially to FIG. 5, will show that each of the slits 24 increases in width through the thickness of the panel 23, in the direction of the fluid flow (arrows 22). Thus, whilst it is relatively easy for the fluid to flow in the direction of the arrows 22, it is difficult for it to flow in the reverse direction.

Alternatively, each of the porous walls 3 and 4 may be made as shown in FIGS. 6 to 8. In this case, the wall includes a fine mesh grill 25 which provides a substantially rigid former for the wall, there being applied to the down-flow face of the grill 25, a flexible sheet 26 made of rubber or plastics material. This sheet 26 is pierced by a plurality of cruciform slits 27, which provide supple lips 28, which are able to separate to allow the water to pass when it flows in the normal direction indicated by the arrows 22. A single cruciform hole is shown in FIG. 8, in the partially open condition, and it will be observed that in this condition, the lips 28 move away from each other, to allow the fluid to flow therethrough. If on the other hand, the water has any tendency to flow back in the opposite direction, the presence of the grill 25 prevents the tongues 28 from opening in the opposite direction. These tongues 28 therefore constitute unidirectional valves, which allow the circulation of the water only in the direction of the arrows 22.

FIGS. 9 and 10, show another variant, in which the flexible sheet 26 itself constitutes the porous wall 3 or 4, without it being necessary to add to it a mesh 23. In this arrangement, each tongue 28 of the holes 27, is formed at its end with a claw 29, able to close on to the claws of the outer tongues 28 (see FIG. 10). Thus, the tongues 28 separate from each other in the manner shown in FIG. 8, to allow the water the circulate in the direction of the arrow 22, but if on the other hand the water attempts to flow in the direction of the arrow 30, the tongues 28 close on each other, and the claws 29 engage with each other to prevent the tongues 28 passing to the opposite side of the wall 26.

Yet another method of manufacturing the foraminous walls 3 and 4, is shown in FIGS. 17 to 20. In constructing the wall, a profiled band 55 made from flexible material such a rubber or plastics, is coiled in a helical formation on a mesh or other perforated rigid frame 54. The transverse section of the profiled band 55 is apparent from FIG. 17. It comprises a heel 56 extending along one edge, and a thin flexible lip 57 along the opposite edge. The coiling of the band is carried out with a slight overlap, as shown in FIG. 19, so that the lip 57 of one convolution bears on the exterior face of the heel 56 of the preceding convolution.

This arrangement prevents the treatment material from flowing back in the direction of the arrow 58 (see FIG. 19), but on the other hand, the pressure of the fluid on the inside of the wall, can raise the lips 27 to permit the fluid to flow out in the direction of the arrow 59 through the interstices thus formed (FIG. 20). The entire chamber 2 fitted with this coiled band 55 presents the appearance shown in FIG. 18.

FIGS. 11 to 13 show an alternative arrangement of filtering device which is constructed in a linear form. The apparatus may extend in length, as required, and may for instance be several tens of meters in length or even more, depending on the rate of flow of the fluid to be filtered. The installation may have a rectilinear or curvilinear plan formation and the curvilinear form is illustrated in diagrammatic form in FIG. 12. Inside this linear formation, is the bed of filtering material 6, of which the active zone 5, is located between a water inlet or feed chamber 31, and a collecting chamber 32 for the clean water. Here again, the filtration is carried out by the crossing of two currents, namely the horizontal flow of the water (arrows 22) and the progressive continuous descent of the filtering bed 6 (arrows 15). In the lower part of the reservoir, there are pipes 33, spaced from each other at comparatively long intervals along the length of the construction, through which the filtering medium is lifted up to be delivered as described in the previous example, on to the upper bank 11 of the material. The evacuation of the effluents is carried out through a lateral pipe 34, which runs throughout the length of the apparatus, there being a pipe 35 carrying the impure water to the apparatus, and a pipe 36, collecting the clean water from the apparatus.

Another apparatus in accordance with the invention, is a water softener of the kind illustrated in FIG. 14. In this apparatus, there are grouped together three separate superposed pieces of apparatus, each being very similar to that described with reference to FIG. 1. The treatment bed 37 is constituted by small balls of cationic resins in sodium cycle. In the lowest apparatus 38, the hard water is brought into the central inlet chamber 2a. This water is softened by passage through the active zone 5a of the bed, and it is recovered in the peripheral collecting chamber 8a. The softened water can then be evacuated through the pipe 9a.

Here again, the radial circuit 22 of the water crosses the descending flow 15 of the treatment bed 37. In the lower end of the lowest apparatus 38, the balls of resin of the ion exchanging bed are taken up by one or more injectors 16a which drives them up into a central tube 18a. This tube 18a passes through all three sets of superposed apparatus, and its open top end delivers the balls of resin out at the top of the upper apparatus 39, where they form a bank 17b. The particles of resin then descend through an active zone 5b where their circulation 15b crosses that of a regeneration solution constituted for example by sodium chloride dissolved in water. This solution is introduced by a pipe 1b into the central inlet chamber 2b, and it crosses the active zone 5b (arrows 22b) before being recovered in the collecting chamber 8b from which it is evacuated by a pipe 9b.

When they reach the lower part of the regeneration apparatus 39, the balls of the ion exchanging bed are therefore regenerated. They then fall progressively (as illustrated at 40) into the upper part of the intermediate apparatus 41. In the active zone 5c of this apparatus, they are rinsed by clear water admitted into the central inlet chamber 2c and evacuated from the collecting chamber 8c. Like the regeneration apparatus 39 therefore the rinsing apparatus 41 functions in similar manner to the main treatment apparatus 37. On reaching the lower part of the rinsing apparatus 41, the balls of resin are regenerated and rinsed, and they then fall progressively (as shown at 42) into the upper part of the softening apparatus 38.

It will be appreciated that the apparatus illustrated in FIG. 14 functions in a continuous manner.

An alternative form of continuous water softener is illustrated in FIG. 15. In this arrangement the three superposed pieces of apparatus are grouped within a single sleeve 43, without any horizontal partitions separating the beds of regeneration 5b, rinsing 5c and softening 5a. The three circuits (1b, 2b, 22b, 8b, 9b), (1c, 2c, 22c, 8c, 9c) and (1a, 2a, 22a, 8a, 9a) are established as previously described, independently one of another.

It will be appreciated that the apparatus according to the invention may be used for other fluid treatment processes, for example for removing minerals from a liquid, or to carry out treatment in a gas duct.

We claim:

1. An apparatus for the treatment of fluid comprising an inlet chamber having a first foraminous wall, a collection chamber having a second foraminous wall, said first and second foraminous walls being spaced from each other to provide a treatment zone therebetween, means for passing fluid to be treated from said inlet chamber to said collecting chamber through said first foraminous wall, across said treatment zone and through said second foraminous wall, means for passing treatment material through said treatment zone in a path traversing the path of said fluid, at least one of said first and second foraminous walls being formed by a flexible sheet having a plurality of holes formed therethrough to permit fluid flow in one direction only, each of said holes being of cruciform shape and having lips on one side of said sheet with claws formed at the extremity of each of said lips whereby said claws engage each other if fluid attempts to flow through said sheet from the lipped side of the sheet, and means for supporting said flexible sheet.

2. An apparatus for the treatment of fluid comprising an inlet chamber having a first foraminous wall, a collection chamber having a second foraminous wall, said first and second foraminous walls being spaced from each other to provide a treatment zone therebetween, means for passing fluid to be treated from said inlet chamber to said collecting chamber through said first foraminous wall, and means for passing treatment material through said treatment zone in a path traversing the path of said fluid, at least one of said foraminous walls comprising a rigid perforated former and a flexible band wound helically on said former on the side thereof remote from said inlet chamber, said band being profiled in cross-section to provide a thickened heel along one edge and a flexible lip along the opposite edge, said helical winding being disposed with said lip of one convolution overlying said heel of an adjacent convolution on the downstream side thereof relative to the direction of flow of the fluid through said perforated former to provide a one way valve arrangement.

* * * * *